(12) United States Patent
Shaver (10) Patent No.: US 9,638,089 B2
(45) Date of Patent: May 2, 2017

(54) GASKET ASSEMBLY

(71) Applicant: Dana Automotive Systems Group, LLC, Maumee, OH (US)

(72) Inventor: Kevin T. Shaver, Chicago, IL (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 0 days.

(21) Appl. No.: 14/601,941

(22) Filed: Jan. 21, 2015

(65) Prior Publication Data

US 2015/0204271 A1    Jul. 23, 2015

Related U.S. Application Data

(60) Provisional application No. 61/930,637, filed on Jan. 23, 2014.

(51) Int. Cl.
  *F01N 13/18* (2010.01)
  *F16J 15/08* (2006.01)
  *F16J 15/12* (2006.01)

(52) U.S. Cl.
  CPC ...... *F01N 13/1827* (2013.01); *F16J 15/0825* (2013.01); *F16J 15/126* (2013.01); *F16J 2015/085* (2013.01); *F16J 2015/0868* (2013.01)

(58) Field of Classification Search
  CPC ............. F16J 15/0818; F16J 2015/0862; F16J 2015/0825; F16J 15/0825
  See application file for complete search history.

(56) References Cited

U.S. PATENT DOCUMENTS

| | | | |
|---|---|---|---|
| 1,782,087 A | 11/1930 | Bailey | |
| 2,060,498 A * | 11/1936 | Gobb | 277/597 |
| 2,210,453 A | 8/1940 | Ginn | |
| 3,053,544 A | 9/1962 | Gorsica | |
| 3,448,986 A | 6/1969 | Jelinek et al. | |
| 3,655,210 A * | 4/1972 | Farnam et al. | 277/592 |
| 3,664,676 A | 5/1972 | Petersen | |
| 3,784,212 A * | 1/1974 | Doerfling | 277/592 |
| 3,863,936 A | 2/1975 | Farnam et al. | |
| 3,866,926 A | 2/1975 | Traum | |
| 3,889,961 A | 6/1975 | Farnam | |
| 3,924,863 A | 12/1975 | Nakano et al. | |
| 3,944,235 A | 3/1976 | Gordon | |
| 4,072,316 A * | 2/1978 | Decker et al. | 277/597 |
| 4,083,570 A | 4/1978 | Sugawara | |
| 4,114,906 A | 9/1978 | Jelinek | |
| 4,272,085 A | 6/1981 | Fujikawa et al. | |
| 4,331,336 A | 5/1982 | Czernik et al. | |
| 4,531,750 A | 7/1985 | Herrington | |
| 4,591,170 A | 5/1986 | Nakamura et al. | |
| 4,776,073 A * | 10/1988 | Udagawa | 29/888.3 |
| 4,776,602 A | 10/1988 | Gallo | |
| 4,813,687 A | 3/1989 | Nakayama et al. | |

(Continued)

FOREIGN PATENT DOCUMENTS

EP    0470790 A1    2/1992

*Primary Examiner* — Kristina Fulton
*Assistant Examiner* — Eugene G Byrd
(74) *Attorney, Agent, or Firm* — Marshall & Melhorn, LLC (57) ABSTRACT

A gasket assembly has a middle layer located between an upper layer and a lower layer. The middle layer includes spacer portions that at least partially surround a gap. The gap, the spacer portions and the layers may have insulating and/or conducting portions as needed.

13 Claims, 5 Drawing Sheets

(56) References Cited

U.S. PATENT DOCUMENTS

| | | | |
|---|---|---|---|
| 4,822,062 A * | 4/1989 | Gallo et al. | 277/592 |
| 4,911,972 A | 3/1990 | Mercuri | |
| 5,125,551 A | 6/1992 | Slee | |
| 5,172,920 A | 12/1992 | Schlenk | |
| 5,205,566 A * | 4/1993 | Ueta et al. | 277/596 |
| 5,215,315 A | 6/1993 | Belter | |
| 5,232,229 A | 8/1993 | Udagawa | |
| 5,275,139 A | 1/1994 | Rosenquist | |
| 5,306,024 A | 4/1994 | Udagawa | |
| 5,360,219 A | 11/1994 | Okuda et al. | |
| 5,362,074 A | 11/1994 | Gallo et al. | |
| 5,410,997 A | 5/1995 | Rosenquist | |
| 5,468,003 A | 11/1995 | Staab et al. | |
| 5,482,014 A | 1/1996 | Rosenquist et al. | |
| 5,551,709 A | 9/1996 | Plunkett | |
| 5,586,769 A | 12/1996 | Novil et al. | |
| 5,601,292 A * | 2/1997 | Tanaka et al. | 277/593 |
| 5,628,113 A * | 5/1997 | Tanaka et al. | 29/888.3 |
| 5,695,203 A * | 12/1997 | Udagawa | 277/595 |
| 5,722,670 A | 3/1998 | Novak et al. | |
| 5,924,701 A | 7/1999 | Schweiger | |
| 6,113,109 A | 9/2000 | Lieb et al. | |
| 6,186,506 B1 * | 2/2001 | Kionoshita | 277/313 |
| 6,247,704 B1 | 6/2001 | Battistoni | |
| 6,758,479 B2 | 7/2004 | Miyaoh | |
| 6,923,450 B2 | 8/2005 | Unseld et al. | |
| 7,347,176 B1 * | 3/2008 | Estacio | 123/196 R |
| 7,360,768 B2 * | 4/2008 | Watanabe et al. | 277/592 |
| 7,866,670 B2 * | 1/2011 | Dhole et al. | 277/592 |
| 8,246,053 B2 | 8/2012 | Shaver et al. | |
| 8,550,469 B2 | 10/2013 | Virgin et al. | |
| 2001/0024019 A1 * | 9/2001 | Watanabe et al. | 277/594 |
| 2004/0262849 A1 * | 12/2004 | Pepin | 277/592 |
| 2005/0179210 A1 * | 8/2005 | Sueda | 277/592 |
| 2006/0163819 A1 * | 7/2006 | Kasuya | 277/593 |
| 2006/0232017 A1 * | 10/2006 | Hamada et al. | 277/594 |
| 2007/0024009 A1 * | 2/2007 | Rosenquist et al. | 277/592 |
| 2007/0190307 A1 * | 8/2007 | Li et al. | 428/315.7 |
| 2007/0267822 A1 * | 11/2007 | Imai | 277/593 |
| 2008/0197579 A1 * | 8/2008 | Imai | 277/593 |
| 2008/0211197 A1 * | 9/2008 | Abe et al. | 277/653 |
| 2010/0207334 A1 * | 8/2010 | Virgin et al. | 277/654 |
| 2011/0042904 A1 * | 2/2011 | Clemons et al. | 277/594 |

* cited by examiner

GASKET ASSEMBLY

RELATED APPLICATIONS

This application claims priority to and the benefit of U.S. Application Ser. No. 61/930,637 filed on Jan. 23, 2014, which is incorporated by reference herein.

FIELD OF THE INVENTION

The invention relates to a gasket assembly. More specifically, the invention relates to a gasket assembly for use in an internal combustion engine and/or exhaust system.

BACKGROUND OF THE INVENTION

Gaskets for use in internal combustion engines and exhaust systems are known. However, the gaskets known in the art are limited with regard to their heat transfer properties. Also, the known gaskets are bulky and expensive to manufacture.

Therefore, it is desired to provide an improved gasket assembly which is less complex, less expensive and has improved heat transfer properties.

SUMMARY OF THE INVENTION

A gasket assembly has an upper surface layer and a lower surface layer. The upper surface layer is spaced apart from the lower surface layer. A middle layer is provided between the upper surface layer and lower surface layer. The middle layer includes an inner spacer portion surrounding a first port, an outer spacer portion surrounding the inner spacer portion, and at least one gap radially separating the inner annular spacer portion from the outer annular spacer portion.

BRIEF DESCRIPTION OF THE DRAWINGS

The gasket assembly will become readily apparent to those skilled in the art from the following detailed description when considered in the light of the accompanying drawings in which.

DETAILED DESCRIPTION OF THE INVENTION

It is to be understood that the invention may assume various alternative orientations and step sequences, except where expressly specified to the contrary. It is also to be understood that the specific assemblies, articles and features illustrated in the attached drawings, and described in the following specification are simply exemplary embodiments of the inventive concepts. Hence, specific dimensions, directions, or other physical characteristics relating to the embodiments disclosed are not to be considered as limiting, unless expressly stated otherwise. Also, although they may not be, like elements in various embodiments may be commonly referred to with like reference numerals within this section of the application.

Various embodiments of several gasket assemblies are described herein and illustrated in FIGS. 1-11. The gasket assemblies 20, 44, 56, 78, 104 will be described for use in an internal combustion engine and between joints in an exhaust system for a vehicle. It would be understood by one of ordinary skill in the art that the gasket assemblies 20, 44, 56, 78, 104 may have applications in engines for both light and heavy duty and for passenger, commercial, and off-highway vehicles. Furthermore, it would be understood by one of ordinary skill in the art that the gasket assemblies 20, 44, 56, 78, 104 could have industrial, locomotive, and aerospace applications.

Additionally, the gasket assemblies 20, 44, 56, 78, 104 are depicted as circular in the figures for illustrative purposes only. The gasket assemblies 20, 44, 56, 78, 104 are not limited to being circular, however; instead, the assemblies 20, 44, 56, 78, 104 can be of any shape complementary to the mating parts they are sealing.

Figure 1:
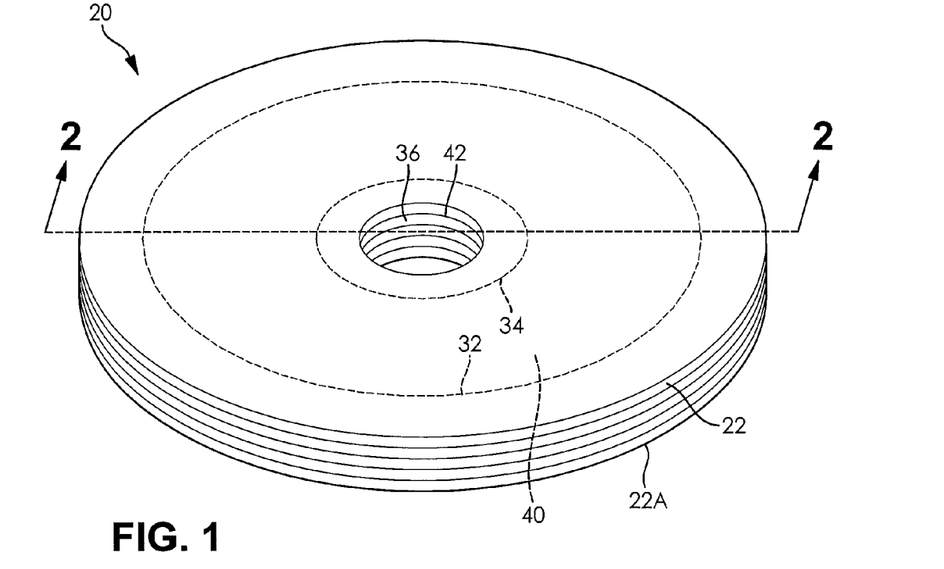
FIG. 1 is a perspective view of an embodiment of a gasket assembly with certain layers of the gasket assembly partially depicted.
Figure 2:
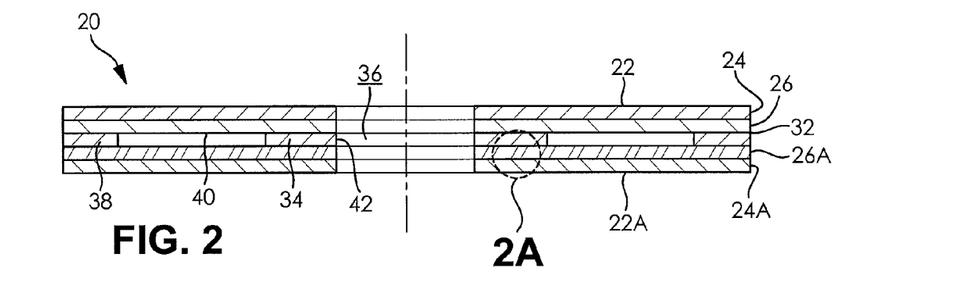
FIG. 2 is a cross-sectional view of the gasket assembly of FIG. 1 taken along line 2-2.

Referring now to the drawings, there is illustrated in FIGS. 1 and 2 a portion of an embodiment of the gasket assembly 20 fully assembled. The gasket assembly 20 can be utilized for all internal combustion engine and exhaust system applications but is particularly well suited for being positioned between joint faces and limiting the heat transfer therebetween. As should be appreciated, the relative thickness of the gasket assembly 20 and/or the relative thicknesses of the layers utilized therein can vary between embodiments of the assembly.

In an embodiment, the gasket assembly 20 comprises an upper surface layer 22. The upper surface layer 22 comprises a facing layer 24 attached to a core layer 26. The gasket assembly 20 also comprises a lower surface layer 22A. The lower surface layer 22A is spaced apart from the upper surface layer 22 and comprises a facing layer 24A attached to a core layer 26A.

The facing layers 24, 24A may be sheet-like. In an embodiment, the facing layers 24, 24A comprise an insulative material to limit heat transfer through and across the gasket assembly 20. Preferably, the facing layers 24, 24A are comprised of an inorganic fibrous material. In certain embodiments, the facing layers 24, 24A comprise mica. However, it should be appreciated that other insulative materials may be used in the facing layers.

Figure 2A:
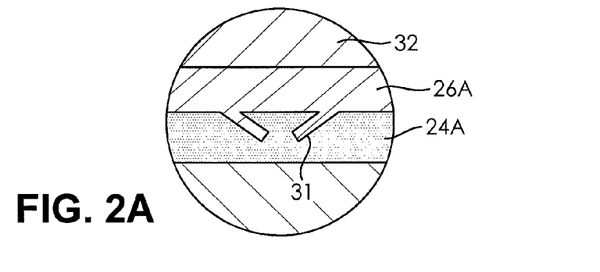

The core layers 26, 26A provide rigidity to the gasket assembly 20 and may be metallic. The core layers 26, 26A may be sheet-like and each layer comprises an inboard surface and an outboard surface. Preferably, the core layers 26, 26A are perforated to allow a facing layer 24, 24A to be attached to the outboard surface of each layer. The perforations may comprise unitary portions of the core layers 26, 26A, such as tangs that have been punched or otherwise radially extending from the layers 26, 26A. Exemplary tangs 31 are shown in the detail of FIG. 2.

Attachment of the facing layers 24, 24A may be further enhanced by disposing an adhesive (not depicted) on the outboard surface of the core layers 26, 26A after perforating the layers. Suitable adhesives for use in the gasket assemblies 20, 44, 56, 78 are known to those skilled in the art.

A middle layer 32 is provided between and separates the upper surface layer 22 and the lower surface layer 22A. Preferably, the middle layer 32 is configured to limit heat transfer through and across the gasket assembly 20.

The middle layer 32 comprises an inner spacer 34. The inner spacer 34 surrounds a first opening 36. The inner spacer 34 may be metallic. Preferably, when the inner spacer 34 is metallic, it comprises stainless steel. In other embodiments, the inner spacer 34 may be ceramic or of a plastic material. In an embodiment, the inner spacer 34 is coated with a thermal barrier coating to limit the heat transfer properties of the spacer.

The middle layer 32 also comprises an outer spacer 38. The outer spacer 38 continuously surrounds the inner spacer 34. The outer spacer 38 may be metallic. Preferably, when the outer spacer 38 is metallic, it comprises stainless steel. In other embodiments, the outer spacer 38 may be ceramic or of a plastic material. In an embodiment, the outer spacer 38 is coated with a thermal barrier coating to limit the heat transfer properties of the spacer.

An insulating portion 40 radially separates the inner spacer 34 from the outer spacer 38. The insulating portion 40 may continuously extend between the inner spacer 34 and outer spacer 38.

The insulating portion 40 comprises an insulative material. Preferably, the insulative material is air. However, the insulative material may be another material which is insulating and limits heat transfer through the gasket assembly 20. For example, in certain embodiments, the insulative material comprises mica, a ceramic powder or the like.

As shown in FIG. 2, the upper surface layer 22 and the lower surface layer 22A overlap both the inner spacer 34 and the outer spacer 38.

The gasket assembly 20 illustrated in FIGS. 1 and 2 has a sealing load distribution. The sealing load distribution can be provided by selecting the height of the spacers 34, 38. In another embodiment, the sealing load distribution is provided by selecting a radial length which separates the spacers 34, 38. In yet another embodiment, the sealing load distribution is provided by selecting a radial thickness of the spacers 34, 38. In still another embodiment, the sealing load distribution is provided by selecting the spacer material and/or the insulative material. Also, the sealing load distribution may be provided by selecting two or more of the height of the spacers, the radial length which separates the spacers, the radial thickness of the spacers, the spacer material and the insulative material.

The first opening 36 is provided through the upper surface layer 22, lower surface layer 22A and middle layer 32. The first opening 36 is provided to permit a fluid to pass through the gasket assembly 20. Preferably, the fluid is in a gaseous state. As illustrated, the first opening 36 may be of a circular shape. The inner spacer 34 preferably continuously surrounds the first opening 36. In these embodiments, the first opening 36 has a diameter 42. The diameter 42 may vary in size between embodiments of the gasket assembly 20. Also, the opening is not limited to being of a circular shape and may be of another shape.

Figure 3:
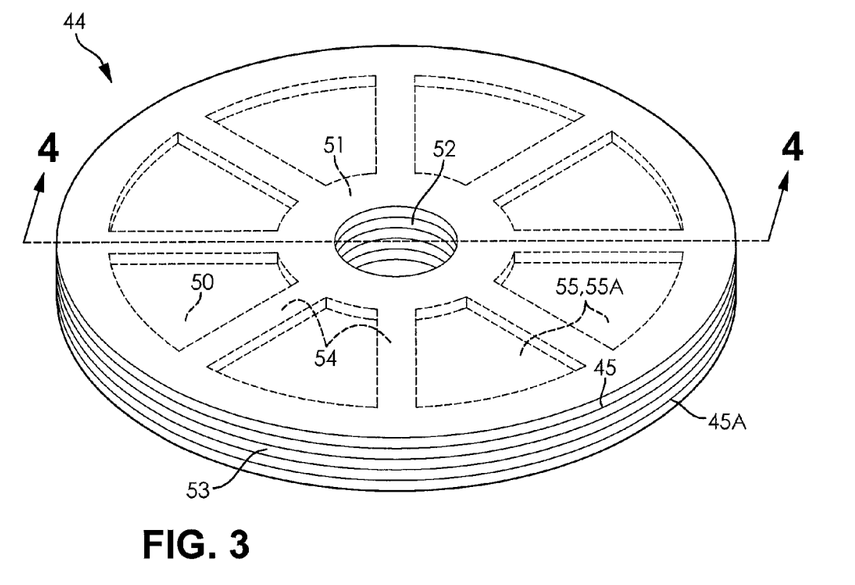
FIG. 3 is a perspective view of an embodiment of another gasket assembly with certain layers of the gasket assembly partially depicted.
Figure 4:
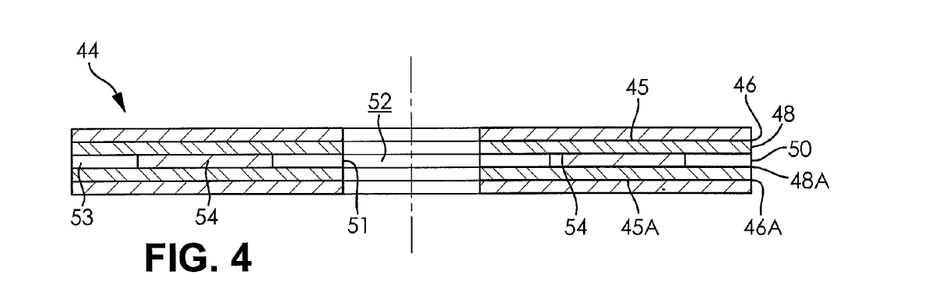
FIG. 4 is a cross-sectional view of the gasket assembly of FIG. 3 taken along line 4-4.

There is illustrated in FIGS. 3 and 4 a portion of another embodiment of a gasket assembly 44 fully assembled. The gasket assembly 44 can be utilized for all internal combustion engine and exhaust system applications but is particularly well suited for being positioned between joint faces. The gasket assembly 44 may be configured for limiting and/or promoting heat transfer between the joint faces. As should be appreciated, the relative thickness of the gasket assembly 44 and/or the relative thicknesses of the layers provided therein can vary between embodiments of the assembly.

The gasket assembly 44 comprises an upper surface layer 45 and a lower surface layer 45A. The upper surface layer 45 comprises a facing layer 46 attached to a core layer 48. The lower surface layer 45A is spaced apart from the upper surface layer 45 and comprises a facing layer 46A attached to a core layer 48. In certain embodiments, the facing layers 46, 46A and core layers 48, 48A are as described above for the facing layers 24, 24A and core layers 26, 26A of the gasket assembly 20 illustrated in FIGS. 1 and 2. In other embodiments, the core layers 48, 48A are as described for the core layers 26, 26A of the gasket assembly 20 illustrated in FIGS. 1 and 2 and the facing layers 46, 46A comprise a conductive material such as, for example, graphite.

The gasket assembly 44 also comprises a middle layer 50 which has an inner spacer 51 surrounding a first opening 52 and an outer spacer 53 surrounding the inner spacer 51. The inner spacer 51, first opening 52 and outer spacer 53 are as described above for the inner spacer 34, first opening 36 and outer spacer 38 of the gasket assembly 20 illustrated in FIGS. 1 and 2. The inner spacer 51 and outer spacer 53 are connected by a plurality of extending portions 54. Preferably, the extending portions 54 are of the same material(s) as the inner spacer 51 and outer spacer 53. As illustrated, the inner spacer 51, outer spacer 53 and plurality of extending portions 54 may be formed in a unitary manner.

As may be seen in FIG. 4, the inner spacer 51 has a planar upper surface and a planar lower surface. The outer spacer 53 has a planar upper surface and a planar lower surface. The upper surface of the outer spacer 53 is co-planar with the upper surface of the inner spacer 51. The lower surface of the outer spacer 53 is co-planar with the lower surface of the inner spacer 51. The outer spacer 53, the inner spacer 51 and the extending portions 54 are co-planar. Note that while FIG. 4 is used to illustrate these features, these features are available in each of the embodiments disclosed herein.

In certain embodiments, the middle layer 50 is configured to limit heat transfer through and across the gasket assembly 44. In these embodiments, the inner spacer 51, outer spacer 53 and plurality of extending portions 54 define a plurality of insulating portions 55. The insulating portions 55 comprise one or more insulative materials. A preferable insulative material is air. However, other materials which are insulating and limit heat transfer through the gasket assembly 44 are suitable for use therein. For example, in certain embodiments, the insulative material comprises mica, a ceramic powder or the like.

In other embodiments, the middle layer 50 is configured to promote heat transfer through and across the gasket assembly 44. In these embodiments, the inner spacer 51, outer spacer 53 and plurality of extending portions 54 define a plurality of conducting portions 55A. The conducting portions 55A comprise one or more conductive materials. Preferably, the one or more conductive materials is a metal powder and/or graphite. However, other conductive materials which are conducting and promote heat transfer through the gasket assembly 44 are suitable for use therein.

In still further embodiments, the inner spacer 51, outer spacer 53 and plurality of extending portions 54 define a plurality of portions 55, 55A where at least one of the plurality of portions comprises an insulative material and at least one of the plurality of portions comprises a conductive material. The conductive materials and insulative materials may be as described above. These embodiments are particularly useful in isolating portions 55, 55A of the gasket assembly 44 to promote or limit heat transfer through a portion of the assembly.

The gasket assembly 44 illustrated in FIGS. 3 and 4 has a sealing load distribution which can be provided as described above for the gasket assembly 20 illustrated in FIGS. 1 and 2. When the gasket assembly 44 is configured to limit heat transfer through and across the assembly or a portion of the assembly, the sealing load distribution may be provided by selecting one or more insulative materials. Additionally, when the gasket assembly 44 is configured to promote heat transfer through and across the assembly or a portion of the assembly, the sealing load distribution may be provided by selecting one or more conductive materials. When the gasket assembly 44 is configured to promote and limit heat transfer through portions of the assembly, the sealing load distribution may be provided by selecting one or more conductive material and one or more insulative materials.

Figure 5:
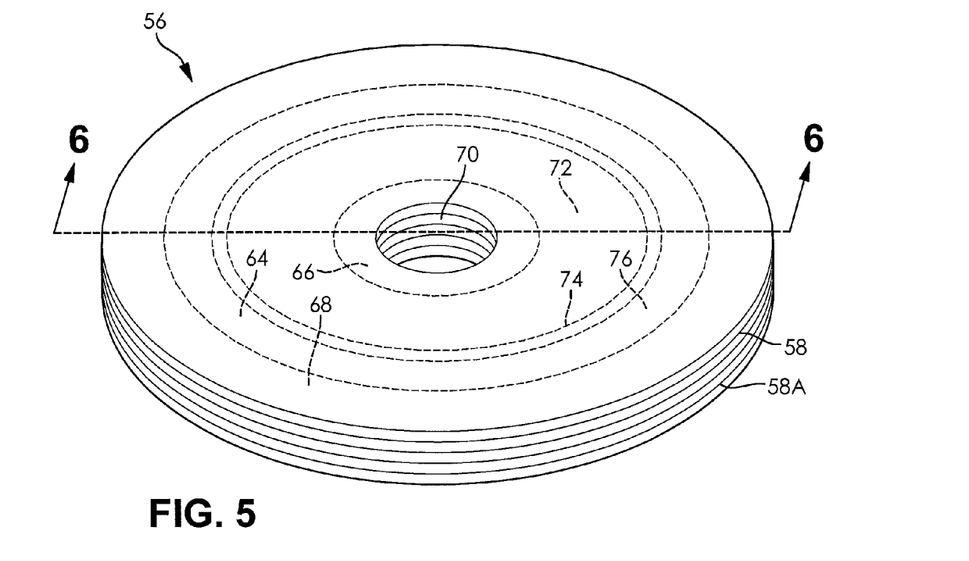
FIG. 5 is a perspective view of an embodiment of another gasket assembly with certain layers of the gasket assembly partially depicted.
Figure 6:
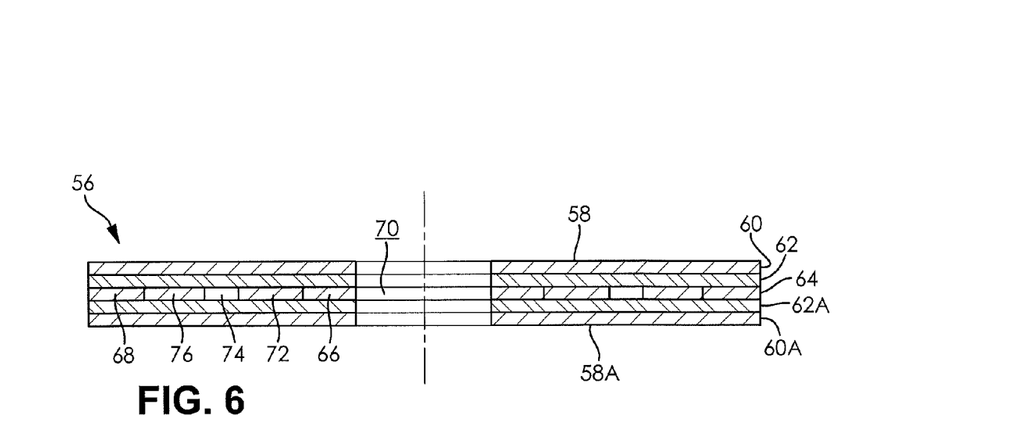
FIG. 6 is a cross-sectional view of the gasket assembly of FIG. 5 taken along line 6-6.

There is illustrated in FIGS. 5 and 6 a portion of another embodiment of a gasket assembly 56 fully assembled. The gasket assembly 56 can be utilized for all internal combustion engine and exhaust system applications but is particularly well suited for being positioned between joint faces. The gasket assembly 56 may be configured for limiting and promoting heat transfer between the joint faces and through certain portions of the assembly. As should be appreciated, the relative thickness of the gasket assembly 56 and/or the relative thicknesses of the layers provided therein can vary between embodiments of the assembly.

The gasket 56 comprises an upper surface layer 58 and a lower surface layer 58A. The lower surface layer 58A is spaced apart from the upper surface layer 58. The upper surface layer 58 comprises a facing layer 60 attached to a core layer 62. Also, the lower surface layer 58A comprises a facing layer 60A attached to a core layer 62A.

The core layers 62, 62A are preferably metallic and as described above for the core layers 26, 26A of the gasket assembly 20 illustrated in FIGS. 1 and 2. The facing layers 60, 60A comprise a conductive material. Preferably, the conductive material is graphite.

A middle layer 64 is provided between the upper surface layer 58 and the lower surface layer 58A. The middle layer 64 is configured to limit and promote heat transfer through certain portions of the gasket assembly 56. The middle layer 64 comprises an inner spacer 66 and an outer spacer 68. Preferably, the inner spacer 66 continuously surrounds a first opening 70 and the outer spacer 68 continuously surrounds the inner spacer 66. The inner spacer 66, outer spacer 68 and first opening 70 are preferably as described above for the inner spacer 34, outer spacer 38 and first opening 36 of the gasket assembly 20 illustrated in FIGS. 1 and 2.

An insulating portion 72 radially separates the inner spacer 66 from the outer spacer 68. Preferably, the insulating portion 72 continuously surrounds the inner spacer 66. The insulating portion 72 comprises an insulative material. In certain embodiments, the insulative material is in a solid state. In these embodiments, the insulative material may be mica or the like. In other embodiments, the insulative material is in a gaseous state. In these embodiments, the insulative material may be air. In still other embodiments, the insulative material is a powder. For example, the insulative material may be a ceramic powder.

Preferably, when the insulative material is in a gaseous state or is a powder, an intermediate spacer 74 is provided between the inner spacer 66 and the outer spacer 68. Preferably, the intermediate spacer 74 continuously surrounds the inner spacer 66. The intermediate spacer 74 surrounds the insulating portion 72. In an embodiment, the intermediate spacer 74 surrounds the inner spacer 66, first opening 70 and insulating portion 72. The outer spacer 68 surrounds the inner spacer 66, first opening 70 and intermediate spacer 74.

Separating the outer spacer 68 from the intermediate spacer 74 is a conducting portion 76. Preferably, the conducting portion 76 continuously surrounds the inner spacer 66, first opening 70 and intermediate spacer 74. The conducting portion 76 comprises a conductive material. In certain embodiments, the conductive material is in a solid state. In these embodiments, the conductive material may be metallic, graphite or the like. In other embodiments, the conductive material is a powder. For example, the conductive material may be a metallic or graphite powder.

The gasket assembly 56 illustrated in FIGS. 5 and 6 has a sealing load distribution. The sealing load distribution can be provided by selecting the height of one or more of the spacers 66, 68, 74. In another embodiment, the sealing load distribution is provided by selecting a radial length which separates the spacers 66, 68, 74. In yet another embodiment, the sealing load distribution is provided by selecting a radial thickness of one or more of the spacers 66, 68, 74. In still another embodiment, the sealing load distribution is provided by selecting the spacer material. Additionally, the sealing load distribution may be provided by selecting the insulative material and the conductive material.

Figure 7:
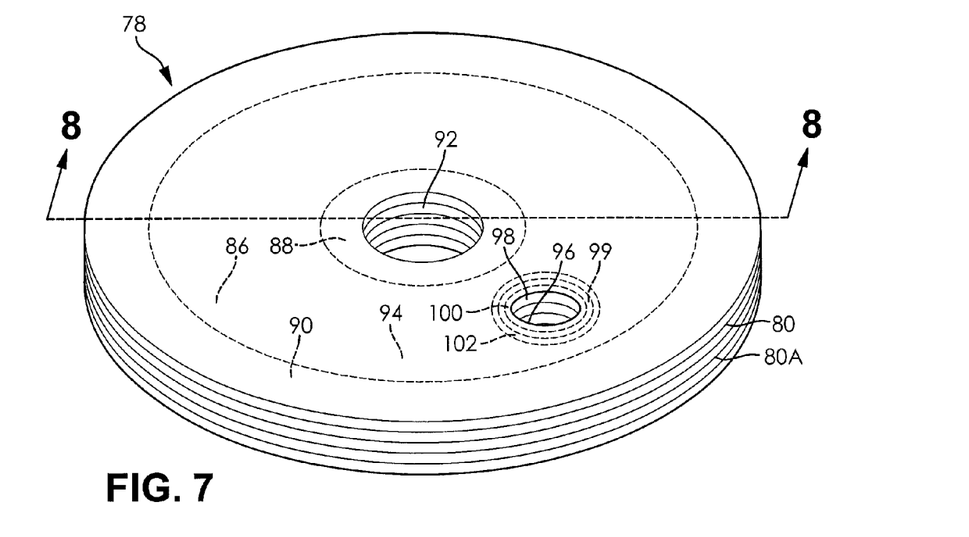
FIG. 7 is a perspective view of an embodiment of another gasket assembly with certain layers of the gasket assembly partially depicted.
Figure 8:
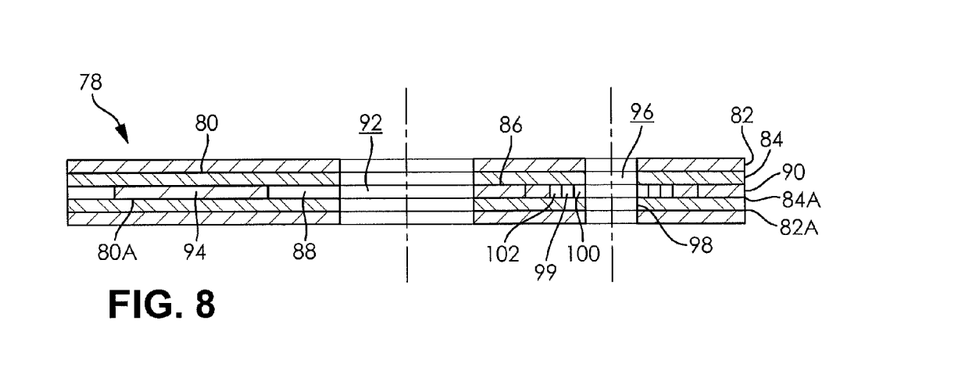
FIG. 8 is a cross-sectional view of the gasket assembly of FIG. 7 taken along line 8-8.

There is illustrated in FIGS. 7 and 8 a portion of another embodiment of a gasket assembly 78 fully assembled. The gasket assembly 78 can be provided for all internal combustion engine and exhaust system applications but is particularly well suited for being positioned between joint faces. The gasket assembly 78 may be configured for limiting and promoting heat transfer between the joint faces and through certain portions of the assembly. As should be appreciated, the relative thickness of the gasket assembly 78 and/or the relative thicknesses of the layers provided therein can vary between embodiments of the assembly.

The gasket assembly 78 comprises an upper surface layer 80 and a lower surface layer 80A. The lower surface layer 80A is spaced apart from the upper surface layer 80. The upper surface layer 80 comprises a facing layer 82 attached to a core layer 84. Also, the lower surface layer 80A comprises a facing layer 82A attached to a core layer 84A.

The core layers 84, 84A are preferably metallic and are as described above for the core layers 26, 26A of the gasket assembly 20 illustrated in FIGS. 1 and 2. The facing layers 82, 82A comprise a conductive material. Preferably, the conductive material is graphite.

A middle layer 86 is provided between the upper surface layer 80 and the lower surface layer 80A. The middle layer 86 is configured to limit and promote heat transfer through certain portions of the gasket assembly 78. The middle layer 86 comprises an inner spacer 88 and an outer spacer 90. Preferably, the inner spacer 88 surrounds a first opening 92 and the outer spacer 90 surrounds the inner spacer 88. The inner spacer 88, outer spacer 90 and first opening 92 are as described above for the inner spacer 34, outer spacer 38 and first opening 36 of the gasket assembly 20 illustrated in FIGS. 1 and 2.

An insulating portion 94 radially separates the inner spacer 88 from the outer spacer 90. The insulating portion 94 may continuously surround the inner spacer 88. The insulating portion 94 comprises an insulative material. In certain embodiments, the insulative material is in a solid state. In these embodiments, the insulative material may be mica or the like. In other embodiments, the insulative material is in a gaseous state. In these embodiments, the insulative material may be air. In still other embodiments, the insulative material is a powder. For example, the insulative material may be a ceramic powder.

A second opening 96 is provided through the upper surface layer 80, lower surface layer 80A and middle layer 86. The second opening 96 is provided to permit a fluid to pass through the gasket assembly 78. The fluid may be in a liquid or gaseous state. The second opening 96 may be of a circular shape. In this embodiment, the second opening 96 has a diameter 98. The diameter 98 may vary in size between embodiments of the gasket assembly 78. Also, the second opening 96 is not limited to being of a circular shape and may be another shape.

Preferably, the second opening 96 is thermally isolated. In this embodiment, the second opening 96 is surrounded by a conducting portion 99. Preferably, the conducting portion 99 is concentric with the second opening 96. In this embodiment, the conducting portion 99 may be annular. The conducting portion 99 comprises a conductive material. In certain embodiments, the conductive material is in a solid state. In these embodiments, the conductive material may be metallic, graphite or the like. In other embodiments, the conductive material is a powder. For example, the conductive material may be a metallic or graphite powder.

The second opening 96 and conducting portion 99 may also be surrounded by the insulating portion 94. The second opening 96 is also surrounded by one or more spacers 90, 100, 102. For example, the second opening 96 is surrounded by the outer spacer 90. Further, in an embodiment, a third spacer 100 may be provided adjacent the second opening 96. In this embodiment, the third spacer 100 may separate the second opening 96 from the conducting portion 99. In another embodiment, the second opening 96 is surrounded by a fourth spacer 102. The fourth spacer 102 also surrounds the conducting portion 99 and separates the insulating portion 94 therefrom.

When the second opening 96 is of a circular shape, the third spacer 100 may be annular. The third spacer 100 may be metallic. Preferably, when the third spacer 100 is metallic, it comprises stainless steel. In other embodiments, the third spacer 100 may be ceramic or of a plastic material. In an embodiment, the third spacer 100 is coated with a thermal barrier coating to limit the heat transfer properties of the third spacer.

The fourth spacer 102 surrounds the third spacer 100 and is preferably concentric therewith. When the third spacer 100 is annular, the fourth spacer 102 may be annular. The fourth spacer 102 may be metallic. Preferably, when the fourth spacer 102 is metallic, it comprises stainless steel. In other embodiments, the fourth spacer 102 may be ceramic or of a plastic material. In an embodiment, the fourth spacer 102 is coated with a thermal barrier coating to limit the heat transfer properties of the fourth spacer.

The gasket assembly illustrated in FIGS. 7 and 8 has a sealing load distribution. The sealing load distribution can be provided by selecting the height of one or more of the spacers 88, 90, 100, 102. In another embodiment, the sealing load distribution is provided by selecting a radial length which separates the spacers 88, 90, 100, 102. In yet another embodiment, the sealing load distribution is provided by selecting a radial thickness of one or more of the spacers 88, 90, 100, 102. In still another embodiment, the sealing load distribution is provided by selecting the spacer material. Additionally, the sealing load distribution may be provided by selecting the insulative material and the conductive material.

Figure 9:
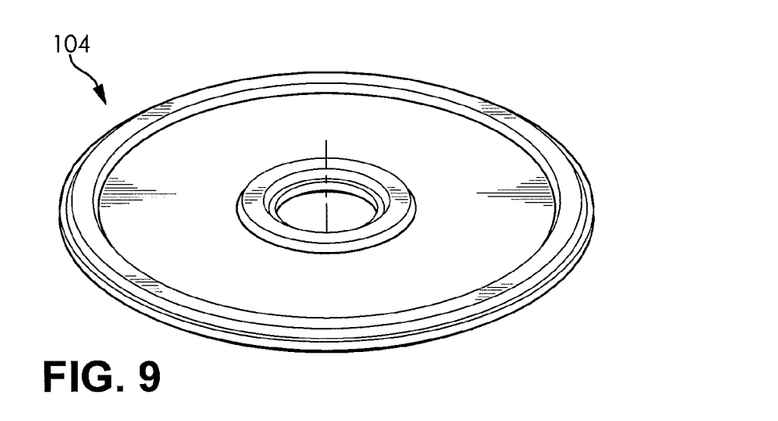
FIG. 9 is a perspective view of an embodiment of another gasket assembly.
Figure 10:
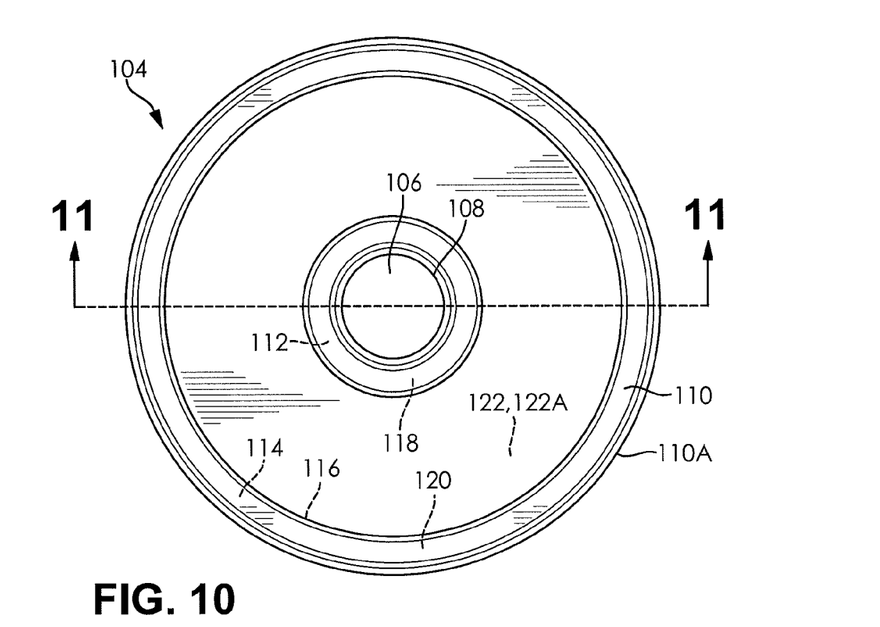
FIG. 10 is a top view of the gasket assembly of FIG. 9.
Figure 11:
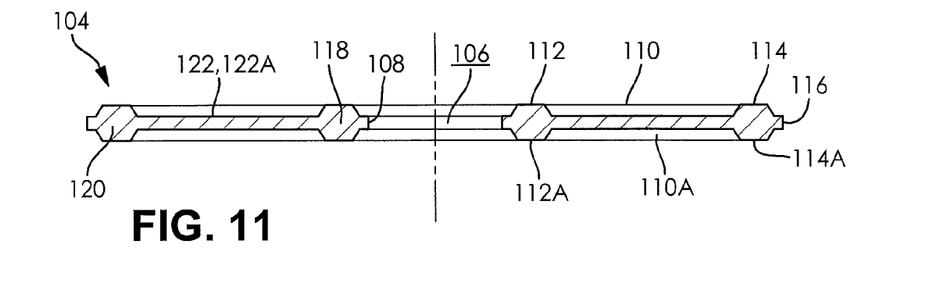
FIG. 11 is a cross-sectional view of the gasket assembly of FIG. 10 taken along line 11-11.

Additionally, there is illustrated in FIGS. 9-11 a portion of an embodiment of an assembly 104 fully assembled. The gasket assembly 104 can be provided for all internal combustion engine and exhaust system applications but is particularly well suited for being positioned between joint faces. The gasket assembly 104 may be configured for limiting and/or promoting heat transfer between the joint faces. Also, after being assembled, a coating can be applied to the gasket assembly 104 to improve the heat transfer properties thereof. Further, as should be appreciated, the relative thickness of the gasket assembly 104 and/or relative thicknesses of the layers provided therein can vary between embodiments of the assembly.

A first opening 106 is provided through the gasket assembly 104. The first opening 106 is provided to permit a fluid to pass through the gasket assembly 104. Preferably, the fluid is in a gaseous state. As illustrated, the first opening 106 may be of a circular shape. In this embodiment, the opening has a diameter 108. The diameter 108 may vary in size between embodiments of the gasket assembly 104. Also, the opening 106 is not limited to being of a circular shape and may be of another shape.

The gasket assembly 104 comprises an upper surface layer 110. The upper surface layer 110 is preferably metallic. Metals suitable for use in the upper surface layer 110 include stainless steel, carbon steel and the like. The gasket assembly 104 also comprises a lower surface layer 110A. The lower surface layer 110A is spaced apart from the upper surface layer 110. The lower surface layer 110A is preferably metallic. Metals suitable for use in the lower surface layer 110A include stainless steel, carbon steel and the like.

The upper surface layer 110 and lower surface layer 110A each comprise an inner bead 112, 112A and an outer bead 114, 114A. The inner beads 112, 112A surround the first opening 106 and provide a primary seal there around. When the first opening 106 is of a circular shape, the inner beads 112, 112A are preferably annular. The inner beads 112, 112A can be of a desired configuration. For example, in cross-section, the inner beads 112, 112A can be of a V-shape, arcuate shape, trapezoidal shape or another suitable shape known to those skilled in the art.

The outer beads 114, 114A provide a seal around a portion of a middle layer 116. Also, the outer beads 114, 114A provide a secondary seal around the first opening 106. When the first opening 106 is of a circular shape, the outer beads 114, 114A may be annular. The outer beads 114, 114A can be of a desired configuration. For example, in cross-section, the outer beads 114, 114A can be of a V-shape, arcuate shape, trapezoidal shape or another suitable shape known to those skilled in the art.

The middle layer 116 is provided between and separates the upper surface layer 110 and lower surface layer 110A. Preferably, the middle layer 116 is configured to limit heat transfer through and across the gasket assembly 104.

The middle layer 114 comprises an inner spacer 118. The inner spacer 118 is aligned with the inner beads 114, 114A and surrounds the first opening 106. When the first opening 106 is of a circular shape, the inner spacer 118 may be an annular. The inner spacer 118 may be metallic. Preferably, when the inner spacer 118 is metallic, it comprises stainless steel. In other embodiments, the inner spacer 118 may be ceramic or of a plastic material. In an embodiment, the inner spacer 118 is coated with a thermal barrier coating to limit the heat transfer properties of the inner spacer.

The middle layer 114 also comprises an outer spacer 120. The outer spacer 120 is aligned with the outer beads 114, 114A, surrounds the inner spacer 118 and is preferably concentric therewith. When the inner spacer 118 has an annular shape, the outer spacer 120 may be of an annular shape. The outer spacer 120 may be metallic. Preferably, when the outer spacer 120 is metallic, it comprises stainless steel. In other embodiments, the outer spacer 120 may be ceramic or of a plastic material. In an embodiment, the outer spacer 120 is coated with a thermal barrier coating to limit the heat transfer properties of the outer spacer.

In an embodiment, an insulating portion 122 radially separates the inner spacer 118 from the outer spacer 120. The insulating portion 122 may be entirely located between the inner spacer 118 and the outer spacer 120. In this embodiment, the insulating portion 122 may be annular.

The insulating portion 122 comprises an insulative material. Preferably, the insulative material comprises air. However, the insulating portion 122 may comprise other materials which are insulating and limit heat transfer through and across the gasket assembly 104. For example, in certain embodiments, the insulating material comprises mica, a ceramic powder or the like.

In another embodiment, a conducting portion 122A radially separates the inner spacer 118 from the outer spacer 120. The conducting portion 122A may be entirely between the inner spacer 118 and the outer spacer 120. In this embodiment, the conducting portion 122A may be annular.

The conducting portion 122A comprises a conductive material. Preferably, the conducting portion 122A comprises a metal powder or graphite. However, the conducting portion 122A may comprise other materials which are conductive and promote heat transfer through and across the gasket assembly.

The gasket assembly 104 illustrated in FIGS. 9-11 has a sealing load distribution. The sealing load distribution can be provided by selecting the height of the spacers 118, 120. In another embodiment, the sealing load distribution is provided by selecting a radial length which separates the spacers 118, 120. In yet another embodiment, the sealing load distribution is provided by selecting a radial thickness of the spacers 118, 120. In still another embodiment, the sealing load distribution is provided by selecting the spacer material. When the gasket assembly 104 comprises an insulation portion 122, the sealing load distribution can be provided by selecting the insulative material. When the gasket assembly 104 comprises a conducting portion 122A, the sealing load distribution can be provided by selecting the conductive material. Also, the sealing load distribution may be provided by selecting the height, width or cross-sectional shape of the inner beads 112, 112A and/or the outer beads 114, 114A.

From the foregoing detailed description, it will be apparent that various modifications, additions, and other alternative embodiments are possible without departing from the true scope and spirit. The embodiments discussed herein were chosen and described to provide the best illustration of the principles of the invention and its practical application to thereby enable one of ordinary skill in the art to use the invention in various embodiments and with various modifications as are suited to the particular use contemplated. As should be appreciated, all such modifications and variations are within the scope of the invention.

What is claimed is:

1. A gasket assembly, comprising:
   a single metallic upper surface layer; and
   a single metallic lower surface layer spaced apart from the upper surface layer; and
   a middle layer with an upper surface in direct, facing contact with the single metallic upper surface layer and a lower surface in direct facing contact with the single metallic lower surface layer, wherein the middle layer includes an inner spacer portion surrounding a first port, an outer spacer portion at least partially surrounding the inner spacer portion, and at least one insulating portion radially separating the inner annular spacer portion from the outer annular spacer portion, said insulating portion upwardly bounded by said single metallic upper surface layer and lower bounded by said single metallic lower surface layer;
   further comprising extending portions radially connecting said inner spacer portion and said outer spacer portion, wherein said extending portions, said inner spacer portion, and said outer spacer portion are unitary;
   wherein said single metallic upper surface layer and said single metallic lower surface layer overlap both said inner spacer portion and said outer spacer portion;
   wherein said inner spacer portion has a planar upper surface and a planar lower surface.

2. The gasket assembly of claim 1, wherein said inner spacer portion and said outer spacer portion are metallic.

3. The gasket assembly of claim 1, wherein said extending portions, said inner spacer portion and said outer spacer portion have at least one conducting portion.

4. The gasket assembly of claim 1, wherein said extending portions, said inner spacer portion and said outer spacer portion have at least one insulating portion.

5. The gasket assembly of claim 1, wherein said at least one insulating portion is an insulating gap located between each extending portion.

6. The gasket assembly of claim 1, further comprising a conducting portion located radially outward from said inner spacer portion and an insulating portion and radially inward from said outer spacer portion.

7. The gasket assembly of claim 1, further comprising a second port located radially outward from said first port, said second port radially surrounded by at least two internal spacer portions and a conducting portion.

8. The gasket assembly of claim 1, wherein said upper surface layer has at least one of an inner bead and an outer bead and said lower surface layer has a least one of an inner bead and an outer bead.

9. The gasket assembly of claim 6, wherein said upper surface layer inner bead and said lower surface layer inner bead are located on said inner spacer portion and said upper surface layer outer bead and said lower surface layer outer bead are located on said outer spacer portion.

10. The gasket assembly of claim 1, wherein said outer spacer portion has a planar upper surface and a planar lower surface.

11. The gasket assembly of claim 1, wherein said upper surface of said outer spacer portion is co-planar with said upper surface of said inner spacer portion.

12. The gasket assembly of claim 1, wherein said lower surface of said outer spacer portion is co-planar with said lower surface of said inner spacer portion.

13. The gasket assembly of claim 1, wherein said outer spacer portion, said inner spacer portion and said extending portions are co-planar.

* * * * *